INVENTOR.
TOMAS HIRSCHFELD
BY Robert J. Schiller
ATTORNEY

United States Patent Office 3,513,316
Patented May 19, 1970

3,513,316
ATR DEVICE HAVING TRANSPARENT SLAB ON WHICH IS DEPOSITED AN ULTRA-THIN PHOTOCATHODE
Tomas Hirschfeld, Thousand Oaks, Calif., assignor to Block Engineering, Inc., a corporation of Delaware
Filed Dec. 7, 1967, Ser. No. 688,891
Int. Cl. H01c 7/08
U.S. Cl. 250—211          3 Claims

ABSTRACT OF THE DISCLOSURE

An improved photosensitive device having an optically transparent slab or window in which multiple attenuated total internal reflection of an input beam can occur, and an ultra-thin photoemissive cathode film disposed on a reflecting surface of the window. For film exhibiting peak sensitivity to radiation of wavelength $\lambda$, the ratio of thickness H to $\lambda$ is less than 0.03.

---

This invention relates to optical detectors, and more particularly to improvements in photoemissive detectors.

It is known that absolute photocathode sensitivity can be enhanced employing the phenomenon known as attenuated total internal reflection (ATR). This phenomena can be briefly described as follows: when a light beam, travelling through a first medium of given refractive index, arrives at a plane interface between that first medium and a second medium of relatively low index, depending upon the angle between the beam and the interface the light will be totally reflected back through the first medium. However, the advent of the beam at the interface also sets up an electromagnetic field in the second medium, known as an evanescent wave, which propagates in a direction parallel to the interface and which attenuates exponentially in a direction normal to the interface. The penetration of the evanescent wave is usually of the order of a fraction of a wavelength. If the second medium is non-adsorbent the evanescent wave returns all of its energy to the reflected beam. If the second medium is absorbent, some of the energy of the evanescent wave will be absorbed and reflection is no longer quite total. In the latter case, if the beam is multiply reflected, a portion of the beam energy is therefore absorbed in the second medium at each reflection so that ultimately the entire beam energy can be absorbed. Because of the direction of propagation of the evanescent wave, the effective absorption occurs along a path (i.e. the effective thickness) much longer than the penetration of the wave normal to the surface.

The general technique of employing this phenomenon with photoemissive detectors is described in the papers by Gunter, Erickson and Grant in Applied Optics, 4, 512 (1965) and Rev. Sci. Instr., 36, 1511 (1965); the paper by Rambo, "Impr., Wave Length Response of Photoemissive Surfaces," AirFor. Tech. Doc. Rep., ALTDR, 64–19 (April 1964), the paper by Harrick, J., Opt. Soc. Am., 55, 851 (1965), and the paper by Sizelove and Love in App. Optics, 6, 433 (March 1967).

Generally, the prior art recognises that if an interface is created between a transparent medium and a photoemissive surface, evanescent waves can be set up to excite photoemission with some enhancement of sensitivity. For example, a cesium-antimony cathode transmits red light more readily than blue and thus, to normally incident light, such a cathode is less sensitive in the red than in the blue region of the spectrum. With a multiple reflection technique, although the blue light will be absorbed more quickly, for example in the first few reflections, subsequent reflections will result in considerable absorbence of the red and thus there will be a relative increase in the sensitivity of the photocathode to red light. Typically, the devices described in the literature comprise a multiply reflective slab of, for example, glass, one surface of the slab being in optical contact with a photoemissive cathode surface. In order to introduce light into the slab at the proper angle of incidence to achieve optimum internal reflection, the slab has cemented thereto an entrance prism or window. However, such devices have been limited in that the acceptance angle at the entrance prism is rather small. Further, the light collecting area of the input window is small and thus limits the amount of light admissible for detection. The consequence of the latter limitation is that one is impelled to use a large photocathode. This serves to provide a larger dark current and thus the use of the larger photocathode may not yield any particular improvement of signal to noise ratio of the device.

The photocathode materials used in multiply reflective cells have heretofore been comprises among the characteristics of light absorption, generation of photoelectrons and transparency to photoelectrons. Selection of materials with requisite aspects of these three characteristics sharply limits those materials which are useful.

A principal object of the present invention is to provide an improved multiple, attenuated internally totally reflective photoemissive device which overcomes many of the problems above stated.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Generally, the present invention is an improvement in ATR photocathodes which comprises an ultra thin layer of photoemissive cathode material in contact with a reflecting surface of an ATR cell.

Figure 1:
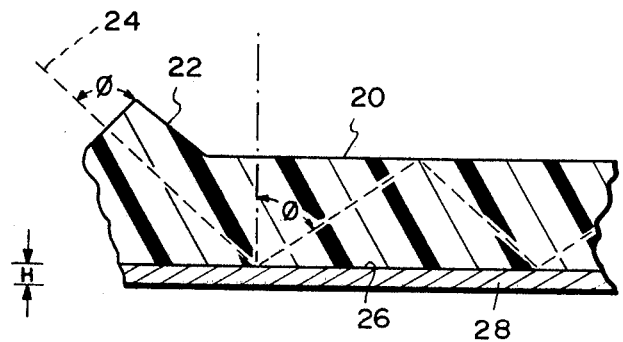
FIG. 1 is a diagrammatic, cross-section through a fragment of device of the present invention, dimensions being exaggerated for the sake of clarity.

Referring now to FIG. 1, there is shown a fragment, in cross-section, of an embodiment of the invention and comprising an ATR cell or transparent slab 20, typically of glass or the like. Coupled to or forming part of slab 20 are means, such as entrance prism 22, for introducing a beam of electromagnetic energy or radiation into the slab. For purposes of this invention, such radiation is considered to include the visible spectrum as well as light in both the infra-red and ultra-violet portions of the spectrum.

Characteristically, the permissible range of incidence angles $\theta$ between the face of prism 22 and incoming radiation incident of that face, (shown as dotted line 24) is determined by the angle of incidence $\theta$ of the radiation to an inside surface 26 of slab 20; $\theta$ of course must be larger than the critical $\theta_c$ in order to obtain proper ATR. In turn, $\theta_c$ is a function (arc sin $1/n_1$) of the material of slab 20, $n_1$ being the index of refraction of the latter. As is known, it is preferred that prism 22 and slab 20 have the same refractive indices.

As $\theta$ increases, the number of reflections decreases (assuming that the length/thickness ratio of the slab is large) and as $\theta - \theta_c$ increases, the interaction between the internally reflecting beam and the reflecting interface is reduced.

Mounted on surface 26 so as to form an optical interface therewith is a thin layer of photocathode material 28. The characteristics of the latter will be described hereafter, but it is advantageous to first provide an appropriate discussion of the enhancement of absorption possible in a single total internal reflection, if layer 28 is very thin and the absorption constant is not too high. It should be noted that for the ultra thin films of the present invention, the effective thickness is often much greater than the actual thickness because of the then relatively long absorption path length of the evanescent wave.

The absorptivity A of material 28 can be described as follows:

$$(1) \quad A = 5.46 de \frac{Kn_2}{\lambda}$$

where $de$ is the effective thickness of the layer, K its absorption coefficient, $n_2$ its index and $\lambda$ the wavelength of the radiation absorbed.

The total reflection absorption enhancement can be described as the ratio of the effective thickness $de$ to the real thickness $d$, i.e. $de/d$. Because for ATR purposes, light is incident obliquely on the reflecting surface, one must distinguish between the behaviour of light polarized perpendicularly (s-polarized) to the incidence plane and light polarized parallel (p-polarized) to the incidence plane. Hence, the effective thickness can be considered to have two values $de_s$ and $de_p$ for the perpendicular and parallel polarizations respectively. The enhancement values are very closely approximated by:

$$(2) \quad (de_s/d) = \frac{4 n_2 n_1 \cos \theta}{n_1^2 - 1}$$

and $$(3) \quad (de_p/d) = \frac{4 n_2 n_1^3 \cos \theta \left[ \sin^2 \theta \left(1 + \frac{1}{n_2^4}\right) - \frac{1}{n_1^2} \right]}{\sin^2 \theta (n_1^4 - 1) - 1 + n_1^2}$$

For the usual high indices of $n_2$ for photocathode materials, Equation 3 can be reduced to:

$$(4) \quad (de_p/d) = \frac{4 n_2 n_1^3 \cos \theta \left( \sin^2 \theta - \frac{1}{n_1^2} \right)}{\sin^2 \theta (n_1^4 - 1) - 1 + n_1^2}$$

These equations are valid for angles of incidence ranging from $\theta_c$ to grazing incidence, when the photocathode layer is thin enough. Within this range of $\theta$, $(de_s/d)$ is maximum at the critical angle and $(de_p/d)$ is maximum at an angle which is a complicated function of the index of the slab. The larger enhancements are always obtained for an s-polarized beam.

For photocathodes, one is interested in the liberated or generated photoelectrons, and the quantum efficiency of a photocathode, of course, depends on the fraction of the incident radiant energy absorbed. But, other factors are also very important. For example, the quantum efficiency is also dependent on the ability of photoelectrons to diffuse through the photocathode to the vacuum interface while retaining sufficient kinetic energy to cross the potential barrier existing at the interface. For purposes of this invention, a more significant factor lies in the tendency for half the photoelectrons to diffuse toward the wrong surface, i.e. toward the photocathode window material, from which (for photocathodes of ordinary thickness) they cannot be reflected with sufficient energy to reach or overcome the potential barrier at the vacuum interface.

The absorption fraction can be kept quite high by ATR techniques, and it has been recognized in the art that a thin photocathode reduces the loss of energy due to diffusion since the mean escape depths for photoelectrons in ordinary photocathode material can be several hundred angstroms. The thin photocathodes of the prior art have, however, been in the nature of a 200 A. and the thinnest discussed appears to be not less than 100 A. The prior art further seems to indicate that while generally efficiency increases with thinness, the optimum increase or gain in efficiency for cathode films occurs at about 150 A. in thickness and that efficiency drops off for thinner films.

The present invention, however, is based upon the discovery that an ultra thin photocathode layer or film (i.e. less than about 100 A. approximately in thickness) exhibits an unexpected and significant increase in quantum efficiency. This increase can be ascribed to a number of factors.

Figure 2:
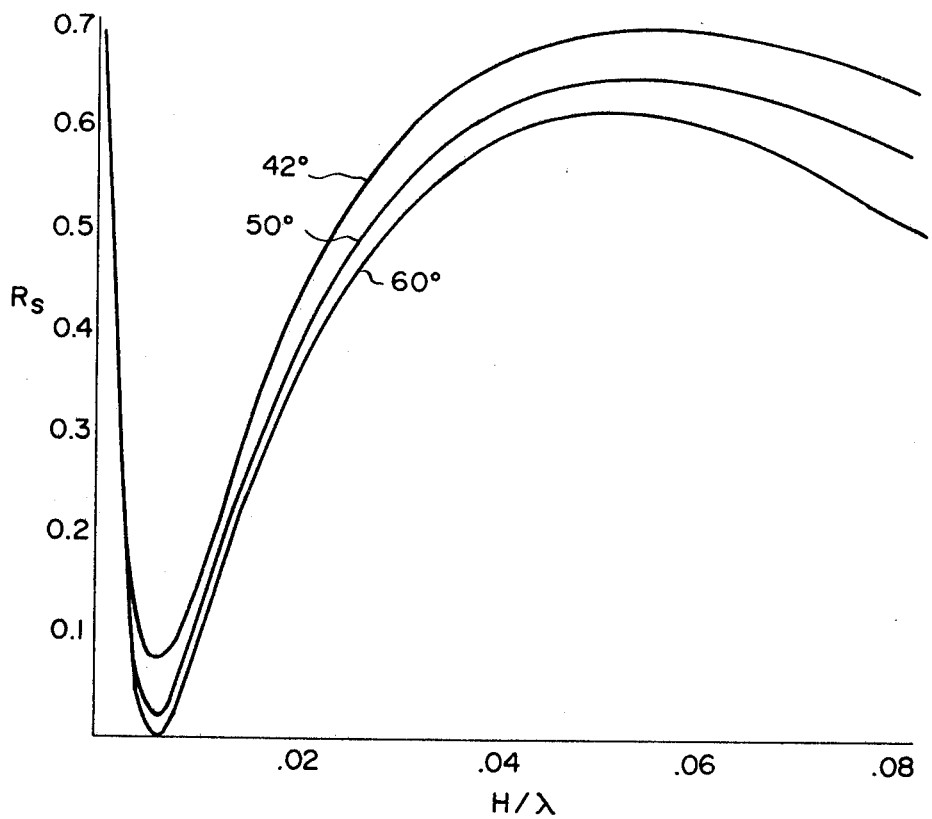
FIG. 2 is a graphical representation showing reflectance as a function of thickness of the photocathode of the present invention for a number of different angles of reflective incidence.

For example, a hitherto unknown absorption peak occurs in ultra thin films as shown in FIG. 2. The latter is a graph of reflectance $R_s$ of the s-polarized beam (singly reflected) plotted against the thickness of layer 28 in terms of exciting wavelength, $(H/\lambda)$, where H is the actual thickness of layer 28 and $\lambda$ is the wavelength of the absorbed radiation. The curves of FIG. 2 are based upon the following conditions: $n$, for slab 20 is 1.5, $n_2$ for layer 28 is 5, the absorption coefficient K for the material of layer 28 is 0.5, and the emitting surface of layer 28 faces a vacuum. The three curves shown, as labeled, are for angles of incidence ($\theta$) of 42°, 50° and 60°. In all cases, a decrease in reflectivity starts at $H/\lambda$ of about .05 and drops to a minimum of less than 10% at $H/\lambda$ of about 0.006. For light of wavelength of 5000 A., these latter values correspond to thicknesses of 250 A., and 30 A. respectively. For ultraviolet radiation of, for example 2000 A., these values then correspond to 100 A. and 12 A. It will be apparent then that the minimum reflectance (or maximum absorption) peak shifts to thinner layers for shorter wavelengths. Reflectance curves of the p-polarized beam ($R_p$ vs. $H/\lambda$) also exhibit a similar unexpected increase in absorption in ultra thin films, but not nearly as great in magnitude, nor over as large a range of values of $\theta$, and with a shallower minimum reflectance occurring at about an $H/\lambda$ value of about 0.016 (corresponding to a photocathode thickness of 80 A. for 5000 A. light).

Figure 3:
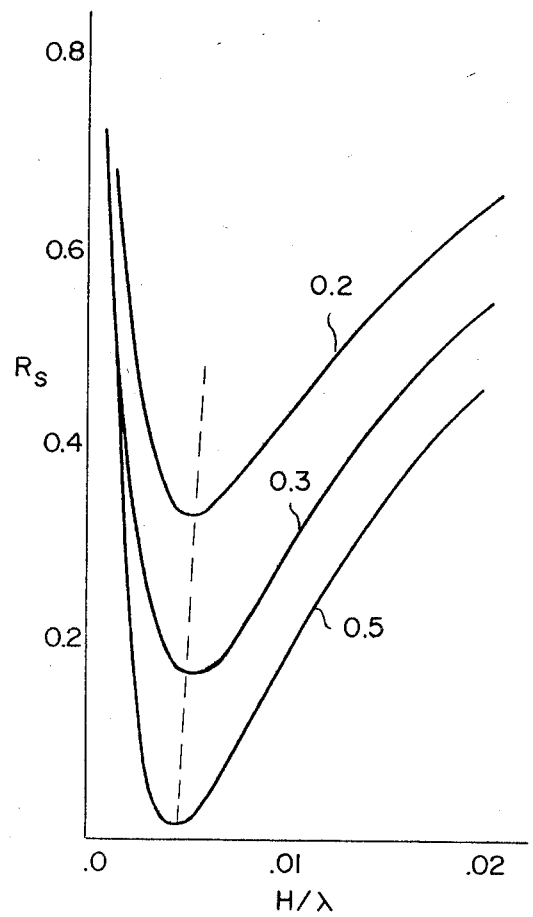
FIG. 3 is a graphical representation showing reflectance as a function of thickness for a number of different absorption coefficients of cathodes of the present invention.

Additionally, if the absorption coefficient K of the cathode material increases, the minimum reflectance peak of the s-polarized beam shifts toward yet smaller values of $H/\lambda$ and exhibits a greater magnitude. This is exhibited graphically in FIG. 3 in which the curves, as labeled, represent K values of 0.2, 0.3, and 0.5 respectively, $n_1$ being 1.3, $n_2$ being 5 and $\theta$ being 51°, a dashed line indicating the change in minima.

Figure 4:
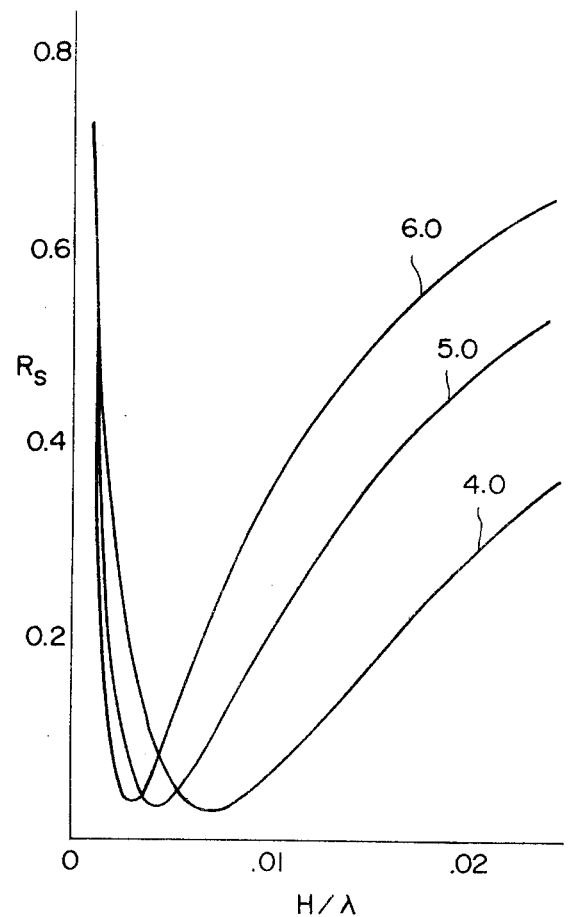
FIG. 4 is a graphical representation showing reflectance as a function of thickness for a number of different indices of refraction of cathode materials.

Similarly, the minimum reflectance occurs at smaller values of $H/\lambda$ as the index of refraction of the cathode film increases, as shown in FIG. 4 wherein the curves are identified by the different values of $n_2$, i.e. 4.0, 5.0, and 6.0. The other parameters, held constant here, are $n_1=1.3$, $K=0.5$ and $\theta=51°$.

A fundamental limit to very high frequency response of photomultipliers to modulated light is the dispersion in the transit time of electrons from the cathode to the first dynode. This arises because the electrons leave the cathode with a wide range of energies due to the statistical energy loss during diffusion to the cathode surface. In the ultra thin cathodes of the present invention, the average energy loss due to diffusion is quite small because of the reduced path length through the cathode. Further, it can be shown that the electromagnetic field distribution in the cathode layer is, for each polarized component of a reflecting beam, highly unidirectional. Therefore, the photoelectrons are subjected to fairly uniform field conditions and this tends to peak the electron emission energies within a narrow range. Also, in the ultra thin photocathodes of the present invention, the electron diffusion process has less opportunity of smearing out the initial distribution of electron directions. Thus, the restrictions on materials suitable for photocathodes, as taught by the prior art are considerably reduced with the present invention, and the range of useful cathode materials materially increased.

Typically, photoemissive materials useful for the cathode layers of the present invention include the usual materials such as the alkali metal antimonide "alloys," cesium antimonide, cesium bismuth antimonide and the like, which typically have K values from about 0.5 to 2 and indices of refraction from about 3 to 5. Materials (e.g. Na, Au) which are normally good absorbers (i.e. K=5 to 7) but, because of low or negligible transparency to photoelectrons, are not ordinarily used for photoemitters, can be used advantageously in the present invention because the thinness of the cathodes reduces the problem of low transparency considerably. These latter materials are highly desirable for photocathodes because they do not saturate and will work at very high intensities.

The ultra thin layers of the present invention can be formed on a surface of an appropriate ATR window by a number of known techniques but it is preferred to create the photocathode layers as one or more monolayers formed by using adsorption properties of the Langmuir isotherm method.

There is in the literature mentioned various cathode types which might show a longer wavelength IR response, if only they were less transparent. The present invention enables their practical use. Very thin cathodes, of the order of a few tens of angstroms in thickness, have considerably lower potential barriers on their vacuum interface, which also is conducive to a longer wavelength IR response.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. In an improved photosensitive device comprising, in combination:
   an attenuated total internal reflecting enclosure, and
   a photoemissive film on a reflecting surface of said enclosure, said film having a thickness H such that $H/\lambda < 0.03$ where $\lambda$ is the wavelength of light to which the film exhibits peak sensitivity.

2. A device as defined in claim 1 wherein H is less than about 100 A.

3. A device as defined in claim 1 wherein said enclosure comprises a slab of material optically transparent to light of wavelength $\lambda$ and having a pair of facing reflective surfaces and means for introducing a beam of said light at an angle to one of said surfaces larger than the critical angle;
   said film forming an interface with said one surface.

References Cited

UNITED STATES PATENTS

| 2,972,691 | 2/1961 | Kossel | 313—94 |
| 3,043,976 | 7/1962 | Kossel | 313—94 |
| 3,308,709 | 3/1967 | Harrick | 88—1 |

RALPH G. NILSON, Primary Examiner

M. ABRAMSON, Assistant Examiner

U.S. Cl. X.R.
250—213; 313—94